United States Patent
Chang et al.

(10) Patent No.: US 10,642,379 B2
(45) Date of Patent: May 5, 2020

(54) STYLUS WITH FUNCTION MODULARIZATION

(71) Applicant: eGalax_eMPIA Technology Inc., Taipei (TW)

(72) Inventors: Chin-Fu Chang, Taipei (TW); Shang-Tai Yeh, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 0 days.

(21) Appl. No.: 16/160,488

(22) Filed: Oct. 15, 2018

(65) Prior Publication Data

US 2020/0019257 A1      Jan. 16, 2020

(30) Foreign Application Priority Data

Jul. 16, 2018   (TW) .............................. 107124522 A

(51) Int. Cl.
  *G06F 3/0354*         (2013.01)
(52) U.S. Cl.
  CPC ................................ *G06F 3/03545* (2013.01)
(58) Field of Classification Search
  CPC .................................................. G06F 3/03545
  USPC ......................................................... 345/179
  See application file for complete search history.

(56) References Cited

U.S. PATENT DOCUMENTS

| 7,780,499 | B1 * | 8/2010 | Truckai | ................. | A63H 33/088 |
| | | | | | 401/195 |
| 8,773,405 | B1 * | 7/2014 | Ryshtun | .............. | G06F 3/03545 |
| | | | | | 178/19.03 |
| 2004/0115994 | A1 * | 6/2004 | Wulff | ................. | H01R 13/2471 |
| | | | | | 439/700 |
| 2012/0154340 | A1 * | 6/2012 | Vuppu | .................... | G06F 3/044 |
| | | | | | 345/179 |
| 2014/0028635 | A1 * | 1/2014 | Krah | ....................... | G06F 3/041 |
| | | | | | 345/179 |
| 2017/0364167 | A1 * | 12/2017 | Ribeiro | ................... | G06F 3/016 |

(Continued)

OTHER PUBLICATIONS

TI (TPS2540 charging port schematic as captured Apr. 14, 2016 and retrieved Aug. 26 from 2019https://web.archive.org/web/20160414144412/https://www.electroschematics.com/11871/diy-usb-condom-circuit/) (Year: 2016).*

(Continued)

*Primary Examiner* — Mark Edwards
(74) *Attorney, Agent, or Firm* — Muncy, Geissler, Olds & Lowe, P.C.

(57) ABSTRACT

A stylus includes a pen body, an internal circuit, at least one modular function device, and a pen head disposed at a lower part of the pen body and including a first conductive part. The modular function device includes a circuit module disposed inside a main body thereof and electrically connected to connection interfaces disposed on upper and lower sides of the main body, respectively. The connection interface of the modular function device can be mounted on the adapted connection interface of the pen body, and two adjacent modular function devices can be concatenated with each other through the adapted connection interfaces thereof. As a result, according to the user's requirement, the stylus can be extended with various modular function devices, and the modular function device mounted on the stylus can also be replaced.

18 Claims, 10 Drawing Sheets

(56) References Cited

U.S. PATENT DOCUMENTS

2018/0081456 A1* 3/2018 Li ............... G06F 3/03545

OTHER PUBLICATIONS

Teyssier et al. (Teyssier, M; Bailly, G; Lecolinet, E; VersaPen: An Adaptable, Modular and Multimodal I/O Pen; CHI'17 Extended Abstracts; May 2017; doi: 10.1145/3027063.3053159) (Year: 2017).*

* cited by examiner

STYLUS WITH FUNCTION MODULARIZATION

This application claims the priority benefit of Taiwan patent application number 107124522, filed on Jul. 16, 2018.

BACKGROUND OF THE INVENTION

1. Field of the Invention

The present invention provides a stylus with function modularization. More particularly, an internal circuit inside a pen body the stylus of the present invention comprises a control module, and various modular function devices can be mounted at an upper part of the pen body through a connection interface of the pen body, so that the modular function devices can be integrated with the internal circuit in the single pen body, to enable the control module to drive the modular function devices to independently perform the different function modes.

2. Description of the Related Art

Touch control interface is one of the most important human-machine input interfaces for modern consumer electronic products or systems, and can be applied to touch panels or touch screens of various electronic products such as smart phones, tablets, and notebook computers. In recent years, the touch control technologies mainly include resistive touch control technology, capacitive touch control technology, electromagnetic touch control technology, ultrasonic touch control technology, infrared touch control technology and so on. Generally, a user can use fingers to click or slide on the screen of the electronic product for operation, or use a stylus to operate the touch electronic product. As the resolution of the touch panel or touch screen continues to increase, it is a better solution for user, who needs high-precision drawing or writing functions, to use the stylus for more accurate control and more convenient operation, instead of body touch.

The general styluses can be classified into an active type and a passive type. A pen head of the passive stylus must be made by conductive material, and when the stylus touches the touch panel, the capacitance value at a touch position on the touch panel can be changed because of the conductive and electrostatic feature of human body, so that the touch position can be determined according to the position where the capacitance value is changed, thereby achieving the purpose of the touch control. When the amount of change in the capacitance value generated on the touch panel is too small, it is hard to accurately determine the touch position. For this reason, the active stylus includes a signal transmitting circuit and a power source, and after the active stylus is turned on, a driving signal can be wirelessly transmitted to the touch panel through an electrode of the signal transmitting circuit, so that the touch panel can determine the position of the pen head of the active stylus according to the position where the driving signal is transmitted, and a pressure sensing unit can be used to sense when the pen head touch the panel, so as to enable the stylus to transmit the control signal. As a result, the touch panel can determine that the stylus is in contact therewith according to the position where the control signal is transmitted, thereby achieving the purpose of touch control.

In recent years, the styluses available in the market have different specifications and functions depending on the touch electronic products corresponding thereto, and the functions of the stylus are directly integrated into a single body, so the conventional stylus cannot be applied to different touch-controlled products. Furthermore, after being used for a long time, the stylus may have the problems of expiration of battery life or replacement of damaged component. Under a condition that the components of the stylus cannot be disassembled or repeatedly installed, it is inconvenient to repair the stylus or replace the broken component of the stylus, and the user can only replace the entire stylus, so that the overall usage cost of the stylus is greatly improved. Furthermore, when the modern people have more multi-function requirements for the stylus and the functions of the applications integrated in the touch electronic products become more and are upgraded continuously, the single-function stylus is not enough for user to operate different touch electronic products, so the user must purchase more styluses with different functions, and it cause the less willingness of user to purchase. Besides, Since the functions of the conventional stylus cannot be expanded or changed thereof according to the user's personalized needs, the operations of the conventional stylus are limited.

SUMMARY OF THE INVENTION

In order to solve the above-mentioned problem, the inventor develops the stylus with function modularization, according to collected data, multiple tests and modifications, and years of research experience in the industry.

An objective of the present invention is that in the stylus, a pen head is disposed in a lower part of a pen body and includes a first conductive part, and an internal circuit comprises a control module electrically connected to the first conductive part and a connection interface on the upper part of a pen holder, respectively and a modular function device includes a circuit module disposed inside a main body thereof and electrically connected to the connection interfaces disposed on upper and lower sides of the main body, respectively and the modular function device can be assembled on the adapted connection interface of the pen body through the connection interface thereof, and two adjacent modular function devices can also be concatenated to each other through the connection interfaces thereof adapted, each of the connection interfaces between the modular function device and the pen body is a pluggable interface and has advantages of small size and simple mounting, so that the stylus of the present invention can be extended with various modular function devices and the modular function device mounted on the stylus can also be replaced upon the user requirement; furthermore, the internal circuit can be integrated with the single pen body, so that the control module can drive the modular function devices to independently perform different function modes, thereby achieving the effect of improving applicability and practicability of the stylus.

Another objective of the present invention is that, in the stylus, the internal circuit comprises a power supply module disposed between the control module of the pen body and the connection interface, and the circuit module of each modular function device can selectively include, upon the function required in the stylus, a charging module, a Bluetooth module, a local-area wireless network module, or a microphone module, so that the charging module of the modular function device can be used to supply power to the power supply module for charging the stylus through the connection interface; however, the present invention is not limited to above-mentioned example, and the pen body can also be implemented without including the power supply module; furthermore, the circuit module of the modular function devices can comprise the power supply module, so that the charging module of other modular function device can supply power to the power supply module for charging the stylus through the connection interface, thereby supplying power for the stylus.

Another objective of the present invention is that the connection interface of the pen body comprises a first connector having a first set of contacts electrically connected to the control module, and each connection interface of the modular function device comprises a second connector having a second set of contacts electrically connected to the circuit module, respectively, and the pen body can be mounted with the modular function device or two adjacent modular function devices can be mounted with each other, for example, through the connection interface by a magnetic connection manner (such as using two magnets), and combination positioning corners of the first connector and the second connector are in cooperation with each other for anti-mistaking and positioning function, so that the second set of contacts can be in electrical contact with the first set of contacts correctly; alternatively, the connection interface of the modular function device can be connected to and stacked on the connection interface of the former modular function device in a sequential order, so as to form a concatenated status; furthermore, the pen body can be mounted with the modular function device or the two adjacent modular function devices can be mounted with each other, by a screwing manner (such as using screw structure), a plugging manner (such as using a plug terminal to plug into an insertion hole), or other connection manner.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
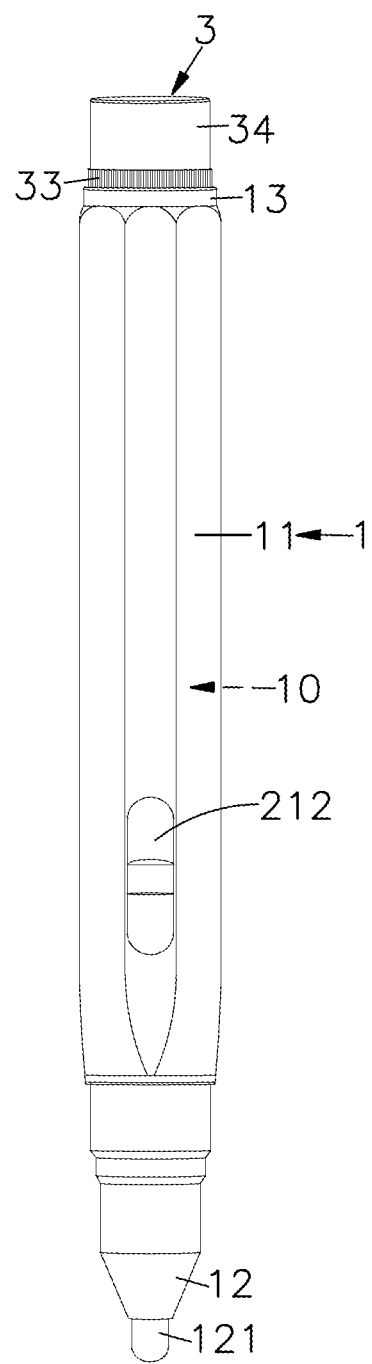
FIG. 1 is a side view of a preferred embodiment of a stylus of the present invention.
Figure 2:
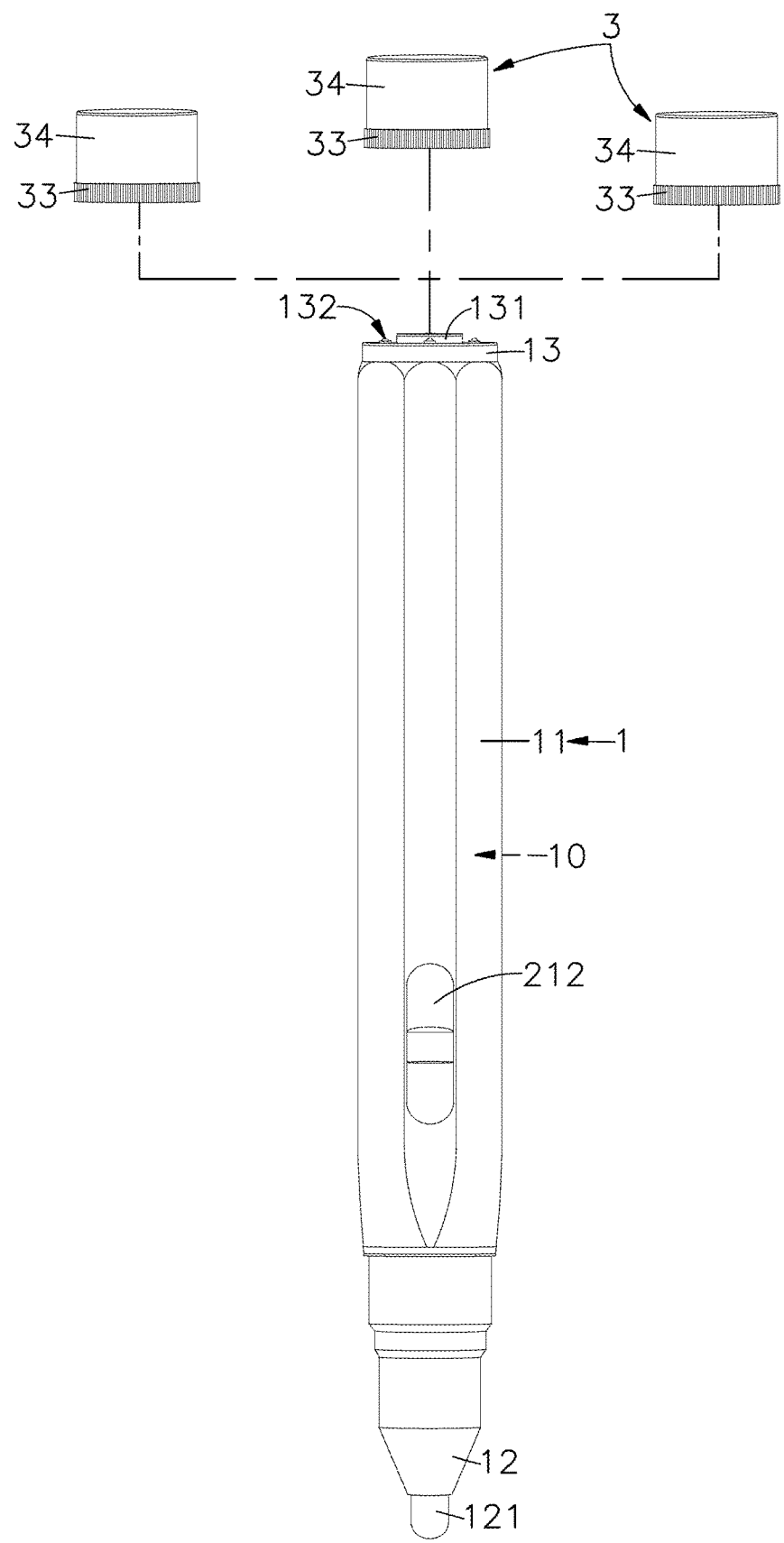
FIG. 2 is an exploded side view of a preferred embodiment of a stylus of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Please refer to FIGS. 1, 2, 3, 4A and 4B, which show a side view and an exploded side view of a stylus of the present invention, a schematic structural view of mounting portions of a pen body and a modular function device, and block diagrams of a preferred embodiment of a stylus of the present invention, respectively. As shown in FIGS. 1, 2, 3, 4A and 4B, the stylus includes a pen body 1, an internal circuit 2, and at least one modular function device 3.

The pen body 1 includes a hollow pen holder 11 defining an accommodation space 10 formed inside thereof, and a pen head 12 disposed at a lower part of the pen holder 11 and including a first conductive part 121 such as a pen core or an electrode, and the pen head 12 also includes a second conductive part 122 disposed above and spaced away from the first conductive part 121, such as a conductive ring, a conductive layer, or an electrode. A connection interface 13 is disposed on an upper part of the pen holder 11, and includes a first connector 131 having a first set of contacts 132, and a joint part 1311 protruded at a central portion thereof, and a first magnet 1312 (such as a magnetic plate with S magnetic pole) mounted inside the joint part 1311. The joint part 1311 includes a combination positioning corner 133 formed on an outer side thereof and a plurality of holes 1313 annularly arranged on an outer periphery thereof. The first set of contacts 132 includes at least one function module connection terminal 1321, a positive power output terminal 1322, a negative power output terminal 1323, a positive power input terminal 1324 and a negative power input terminal 1325 which are formed by pogo pin connectors 132*a* exposed out of the holes 1313, respectively.

The internal circuit 2 is disposed in the accommodation space 10 of the pen holder 11, and comprises a control module 21 and a power supply module 22, and the circuit board of the control module 21 is electrically connected to the first conductive part 121 and the second conductive part 122 of the pen head 12 through a driving signal lines 2111 and a ground line 2112 of the circuit 211, respectively. The control module 21 is configured to generate and output a square wave signal, a sin wave signal, or a pulse width modulation signal to the pen head 12, so as to perform a touch control function on a touch panel of an external electronic device. The circuit board includes the connection interface 13 directly or indirectly disposed thereon, and the control module 21 can also be electrically connected to the function module connection terminal 1321 of the first set of contacts 132 through the conductive line or the bus of the circuit 211. The power supply module 22 can comprise a rechargeable battery, a lithium battery, or an alkaline battery disposed between the control module 21 and the connection interface 13. The alkaline battery can be mounted in the pen holder 11 and replaceable. In this embodiment, the power supply module 22 can be a rechargeable battery, and a first conductive terminal (such as a positive terminal) of the rechargeable battery can be electrically connected to the control module 21 and the positive power output terminal 1322 and the positive power input terminal 1324 of the first set of contacts 132 through the conductive line or the bus of the circuit 211; and, a second conductive terminal (such as a negative terminal) of the rechargeable battery can be electrically connected to the negative power output terminal 1323 and the negative power input terminal 1325 of the first set of contacts 132 through the conductive line or the bus of the circuit 211, so that the power supply module 22 can supply power to the stylus.

Furthermore, the circuit board of the control module 21 comprises a control button 212 electrically connected thereto and disposed on an outer part of the pen holder 11. In an embodiment, the control button 212 can be a mechanical switch, an electronic switch device formed by at least one transistor, a capacitive contact sensor, or a resistive contact sensor. The control button 212 can be disposed on an area where the user's finger holding on the pen body 1 can contact. When the user's finger presses the control button 212, the control module 21 is triggered to generate and output a control signal, so that the control button 212 can be used to control the power supply module 22 to turn on the stylus, or can automatically stop supplying power when the user does not use the stylus, or can facilitate the user to switch function modes of the modular function devices 3 described in the following content. Furthermore, the circuit board of the control module 21 can be electrically connected to an indicator light configured to generate and emit indication light to the outside of the pen holder 11, so as to remind the user of the function mode being currently operated by the stylus, or remind the user of the power supplying status or the charging status of the power supply module 22, for example, that the indicator light continuously emits red light indicates the charging status, and that the indicator light continuously emits green light indicates that the stylus is fully charged, and that the indicator light flashes red light indicates that the battery is in low power or running out.

In this embodiment, the control module 21 includes at least one sensor disposed on the circuit board, such as a gyroscope, an accelerometer, an angular accelerometer, or an antenna. The at least one sensor can be disposed in different positions on the pen body 1, to sense the posture data of the stylus, such as a three-dimensional movement vector, rotation messages in three axes. Furthermore, the sensor can receive, through the multiple electrodes included in the first conductive part 121 of the pen head 12, the electromagnetic wave of the touch driving signal (such as information of intensity, phase, or time difference) emitted from the touch panel, so as to determine the posture of the stylus according to the received information. The control module 21 can comprise a pressure sensor configured to sense a pressure amount generated by contact between the moving pen head 12 and the touch panel, and respond the pressure amount in the signal emitted to the touch panel through the first conductive part 121, and the pressure amount can be used to indicate the control module 21 when to start and when to stop recording a movement trace of the sensor, or notice the touch panel that the pen head 12 clicks the touch panel; and, in an embodiment, the touch panel can provide multi-level pressure sensitivity effect according to different change amount of electric field of the emission signal, for example, the touch panel can show a line with different thickness when the pen head 12 is used to write on the touch panel by different pressure, so as to improve operation convenience and touch control efficiency.

The modular function device 3 includes a main body 31, and a circuit module 32 disposed inside the main body 31, and connection interfaces 33 disposed on upper and lower sides of the main body 31, respectively. The connection interfaces 33 can be directly disposed on the circuit board of the circuit module 32, or electrically connected to the circuit board indirectly through the conductive lines or the bus of the circuit. In an embodiment, a top cover 34 can cover and combine with the connection interface 33 on the top part of the main body 31. Furthermore, the shell of the main body 31 of the modular function device 3 can be in a circular shape, a polygonal shape, or a pen-like shape, so as to match the shape of the pen body 1. The circuit module 32 of each modular function device 3 can be selectively mounted on the stylus to extend function of the stylus upon demand, for example, the modular function device 3 can be, but not limited to, a charging module 32*a* having wired or wireless charging function, or, a wireless communication module such as a Bluetooth module 32*b*, a local-area wireless network module 32*c*, a ZigBee module, a wireless RF module (such as RFID or NFC), or the like; or, the modular function device 3 can be, but not limited to, a microphone module 32*d* converting sound, through a sound receiving hole of the main body 31, into an audio signal, or a sound module outputting corresponding sound according to the posture of the stylus or function mode of the stylus. It should be noted that the details of circuit design and operation of the circuit module 32 are not described in the specification and figures, and one of ordinary skill in the art can refer to related communication protocol or technology specification in the industry to obtain the circuit design and operation of the circuit module 32, so the circuit design and operation of the circuit module 32 are described in following content.

Figure 3:
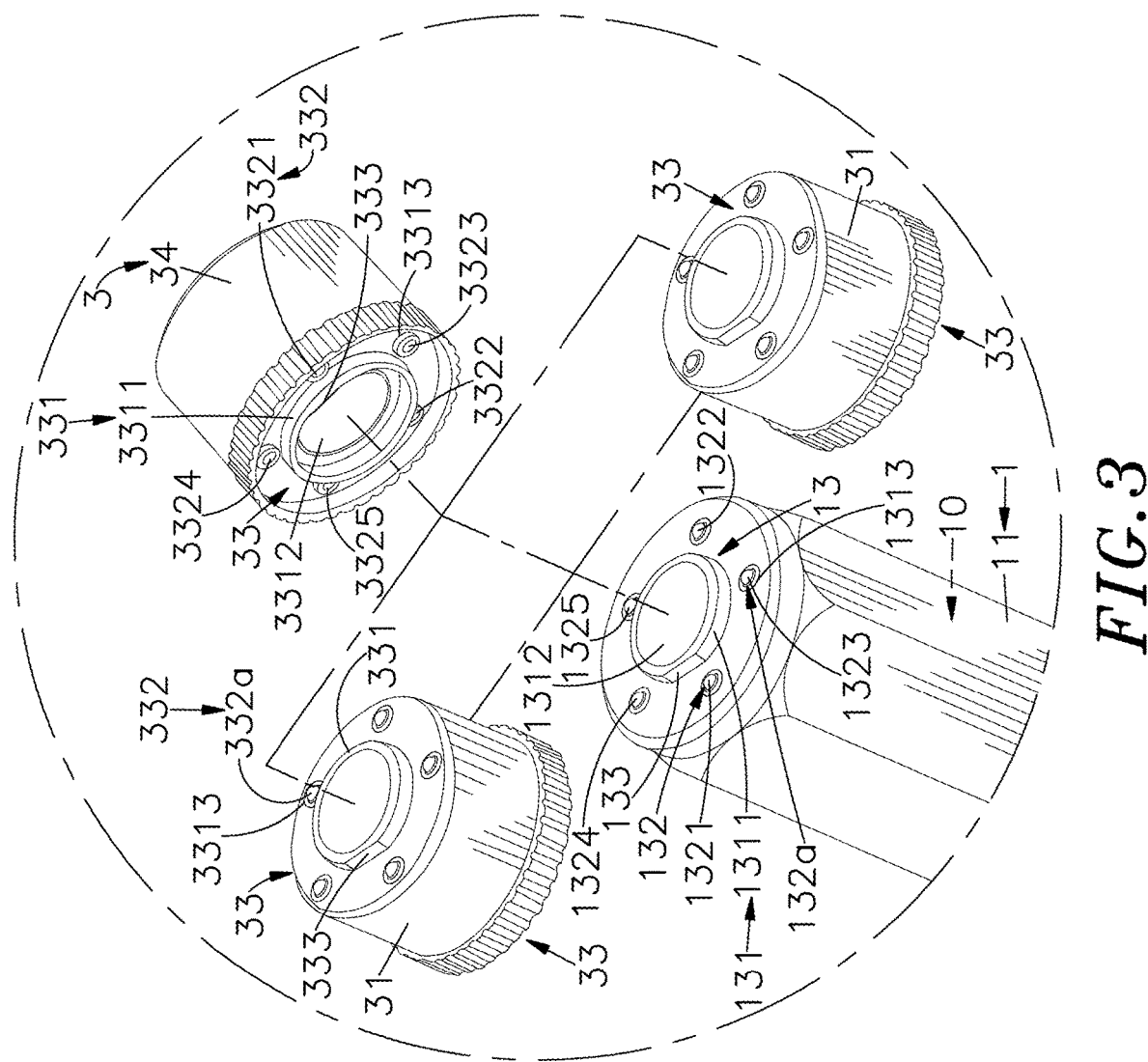
FIG. 3 is a schematic structural view of mounting portions of a pen body and a modular function device of a preferred embodiment of a stylus of the present invention.

As shown in FIG. 3 in this embodiment, the structure of the connection interface 33 and assembly operation for the connection interface 33 are substantially similar to that of the connection interface 13 of the pen body 1, and the difference between the connection interface 33 and the connection interface 13 is in different fastening structures at the mounting portions; and, in actual application, two adjacent modular function devices 3 can be connected to and longitudinally stacked with each other through the connection interfaces 33 thereof and along a central axis of the pen body 1, so as to form a concatenated status. The connection interface 33 can be mounted on the pen body 1 or other modular function device 3, and a positioning part 3311 of a second connector 331 can include a second magnet 3312 (such as a magnetic plate with N magnetic pole or S magnetic pole) disposed inside thereof, and the positioning part 3311 includes a combination positioning corner 333 formed on an outer side thereof and a plurality of holes 3313 formed on an outer periphery thereof, and a second set of contacts 332 of the second connector 331 can include at least one function module connection terminal 3321, a positive power output terminal 3322, a negative power output terminal 3323, a positive power input terminal 3324 and a negative power input terminal 3325 which all are formed by a pogo pin connector 332a exposed out of the holes 3313, respectively. There are many structural designs for the connection interfaces 13 of the pen body 1 and the connection interfaces 33 of the modular function device 3 to enable the first connector 131 and the second connector 331 to connect to each other; furthermore, the first set of contacts 132 and the second set of contacts 332 can also have different contact types, different numbers of the contacts, and different pin configurations for matching the first connector 131 and second connector 331 upon actual application. It should be noted that various equivalent structural changes, alternations or modifications based on the descriptions and figures of present disclosure are all consequently viewed as being embraced by the spirit and the scope of the present disclosure set forth in the claims.

In order to mount the modular function device 3 on the pen body 1, the second connector 331 of the connection interface 33 of the main body 31 can be jointed on the first connector 131 of the connection interface 13 of the pen holder 11, and the positioning part 3311 (such as a block) can be engaged in the joint part 1311 (such as a groove), and the second magnet 3312 can be magnetically attached with the first magnet 1312; furthermore, the two combination positioning corners 133 and 333 can provide anti-mistaking and positioning effect during the jointing process. As a result, the connection interface 33 of the modular function device 3 can be magnetically connected to the connection interface 13 of the pen body 1, and the combination positioning corners 133 and 333 can be used to make the function module connection terminal 3321, the positive power output terminal 3322, the negative power output terminal 3323, the positive power input terminal 3324 and the negative power input terminal 3325 of the second set of contacts 332 electrically contact the function module connection terminal 1321, the positive power output terminal 1322, the negative power output terminal 1323, the positive power input terminal 1324 and the negative power input terminal 1325 of the first set of contacts 132 correctly, respectively. After the circuit 211 is electrically connected to the control module 21 of the internal circuit 2, the control module 21 can drive the circuit module 32 of the modular function device 3 to independently perform the different function modes.

Figure 4A:
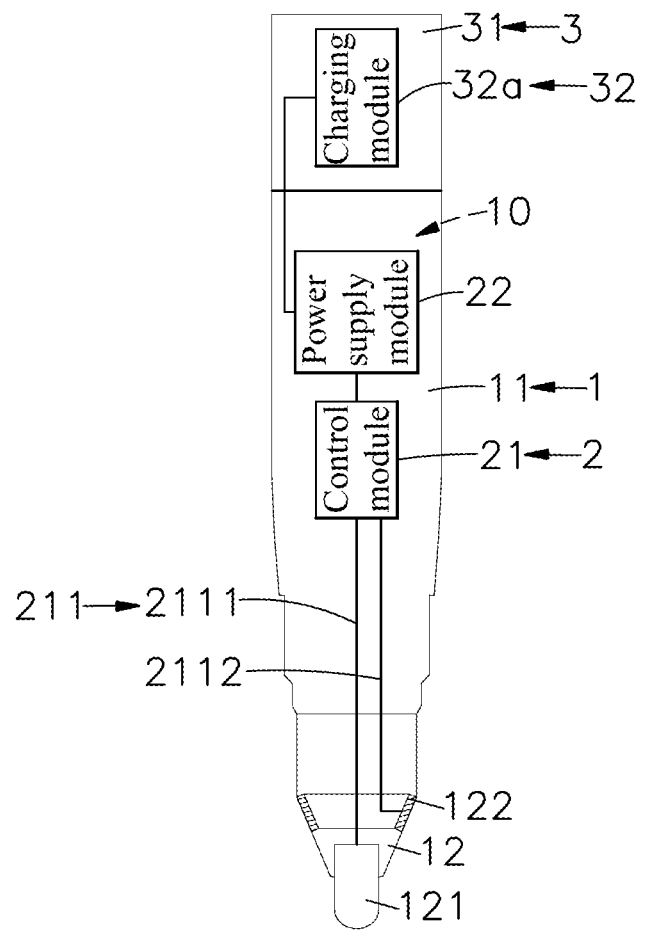
FIG. 4A is a block diagram of a preferred embodiment of a stylus of the present invention.
Figure 4B:
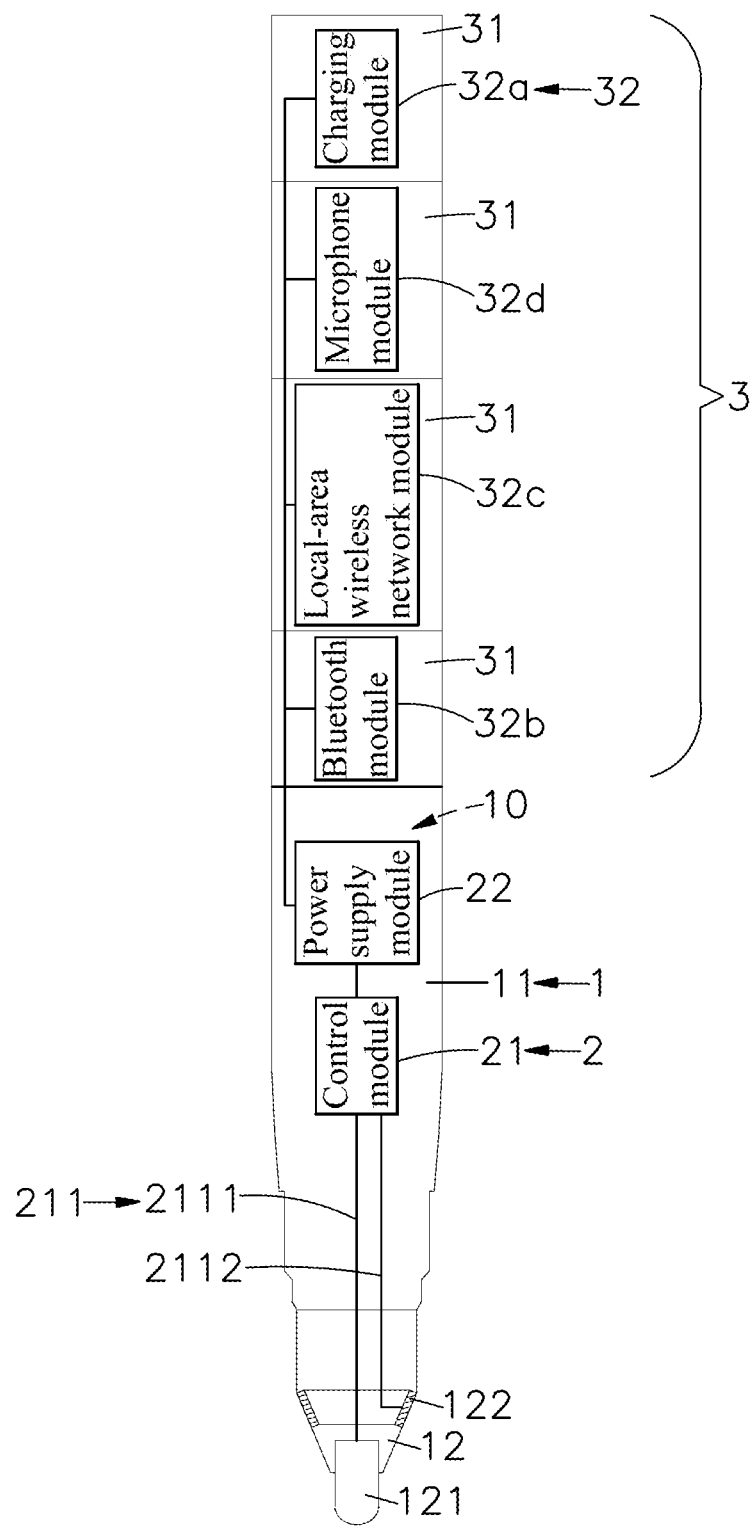
FIG. 4B is a block diagram of a preferred embodiment of a stylus of the present invention.

As shown in FIGS. 4A and 4B, in this embodiment, the internal circuit 2 includes the control module 21 and the power supply module 22, and the modular function device 3 can be mounted on the upper part of the pen holder 11 through the connection interfaces 13 and 33, as shown in FIG. 4A. The circuit module 32 of modular function device 3 can be the charging module 32a; however, the example is merely an exemplary embodiment and the present invention is not limited to this example. For example, the circuit module 32 can be the Bluetooth module 32b, the local-area wireless network module 32c, or the microphone module 32d. Under a condition that the circuit module 32 is implemented by the charging module 32a, the other connection interface 33 of the modular function device 3 can be a connector compliant with Micro-USB interface specification, USB Type-C interface specification, or the Lightning interface specification which is a connector specification developed by Apple Inc., and the other connection interface 33 of the modular function device 3 can be plugged in a charging port on a bezel of the touch panel by a wired charging manner, so that the charging module 32a can supply power, transmitted from the charging port, to the power supply module 22 for charging the stylus, through the connection interfaces 13 and 33; furthermore, the charging module 32a can also include a receiving coil and a rectifier circuit, and the receiving coil can receive electromagnetic energy transmitted from an external power supply device, and the rectifier circuit can rectify the received power and supply the rectified power to the power supply module 22 through the connection interfaces 13 and 33, so as to perform wireless charging operation on the stylus.

Furthermore, the pen body 1 can include a plurality of modular function devices 3 mounted and stacked on an upper part of the pen holder 11 by aforementioned assembly manner, as shown in FIG. 4B. The connection interface 33 of each modular function devices 3 is connected to and longitudinal stacked on the connection interface 33 of the former modular function device 3 in a sequential order, so that two adjacent modular function devices 3 can form the concatenated status through the connection interfaces 33 thereof. The circuit modules 32 of the modular function devices 3 can include the charging module 32a, the microphone module 32d, the local-area wireless network module 32c, and the Bluetooth module 32b mounted between the modular function device 3 and the pen body 1 in a sequential order from up to down.

In this embodiment, through the circuit 211, and the connection interfaces 13 and 33, the control module 21 of the internal circuit 2 can drive the Bluetooth module 32b and the local-area wireless network module 32c of the modular function device 3 to independently emit wireless signals, for example, the wireless signal can be a pairing signal transmitted to the external electronic device directly, or transmit the external electronic device indirectly through the first conductive part 121 of the pen head 12, so as to pair the stylus with the external electronic device; however, the present invention is not limited to this example, and in some embodiments, the data carried on the wireless signal can be a coordinate position, sensing information, command or information provided by other control module 21, and the data is transmitted to the external electronic device for analyzing the location of the stylus, determining the posture of the stylus, or identifying the command, so that the cursor feature (such as type, size or color of a tool) of the external electronic device, a brightness value of the display screen, or a volume of a sound module can be adjusted or changed according to the operation posture of the stylus or the command, and a device can be switched, the operation mode equal to a keyboard or a mouse can be adjusted, or the application program can be opened according to the operation posture of the stylus or the command; furthermore, the control button 212 of the control module 21 can be used to switch the different function modes or generate various commands (such as the command of switching to previous page or next page of the display area of a window, scrolling, switching color or a writing tool, or erasing), so that the operation of the stylus can be quicker and more convenient.

In the stylus of the present invention, the at least one modular function device 3 can be mounted and stacked on the single pen body 1 through the connection interfaces 13 and 33 along a central axis of the pen body 1, so as to form the concatenated status; as a result, the structure of the entire stylus can be stable without being loosened or separated easily. Furthermore, each modular function device 3 and the internal circuit 2 of the pen body 1 can form a uniform plug-and-play function with a standardization interface protocol, so the stylus can be extended with various modular function devices 3, and the modular function device 3 mounted on the stylus can be replaced according to the user's personal requirement, and the stylus can provide multiple functions by using the internal circuit 2 integrated with the single pen body 1. The shape of each modular function device 3 can match the shape of the pen body 1, so that the space and volume occupied by the modular function device 3 can be reduced and the entire stylus can have a more consistent appearance without affecting stability and smoothness of the operation of the stylus while the user holds the pen body 1. The connection interfaces of the modular function device 3 and the pen body 1 are pluggable interfaces and have the advantage of small size and simple mounting or detaching, so the personalized modular function device 3 can be mounted on the single pen body 1 and the stylus of the present invention can be extended and the modular function device 3 can be replaced by the modularization manner, thereby reducing trouble and inconvenience caused by the accessory other than the stylus, and further achieving the effect of improving applicability and practicability of the stylus. As a result, the operation of entire stylus can be more direct and convenient.

The connection interface 33 of the modular function device 3 is electrically connected to the control module 21 of the internal circuit 2 through the connection interface 13 of the pen body 1, and the control module 21 can drive the circuit module 32 of the modular function devices 3 to perform different function modes; however, there are many pin configurations and standardization interface protocol applications for the connection interfaces 13 and 33, so the modular function device 3 can be re-designed based on, for example, the standardization interface protocol or technology specification in the industry, as long as the modular function device 3 can be mounted on the pen body 1, and the control module 21 of the internal circuit 2 electrically connected to the circuit module 32 of the modular function device 3 can provide the plug-and-play function through the circuit 211, and the connection interfaces 13 and 33, so that the control module 21 can drive the modular function devices 3 to independently perform the different function modes. It should be noted that various equivalent structural changes, alternations or modifications based on the descriptions and figures of present disclosure are all consequently viewed as being embraced by the spirit and the scope of the present disclosure set forth in the claims.

Figure 5A:
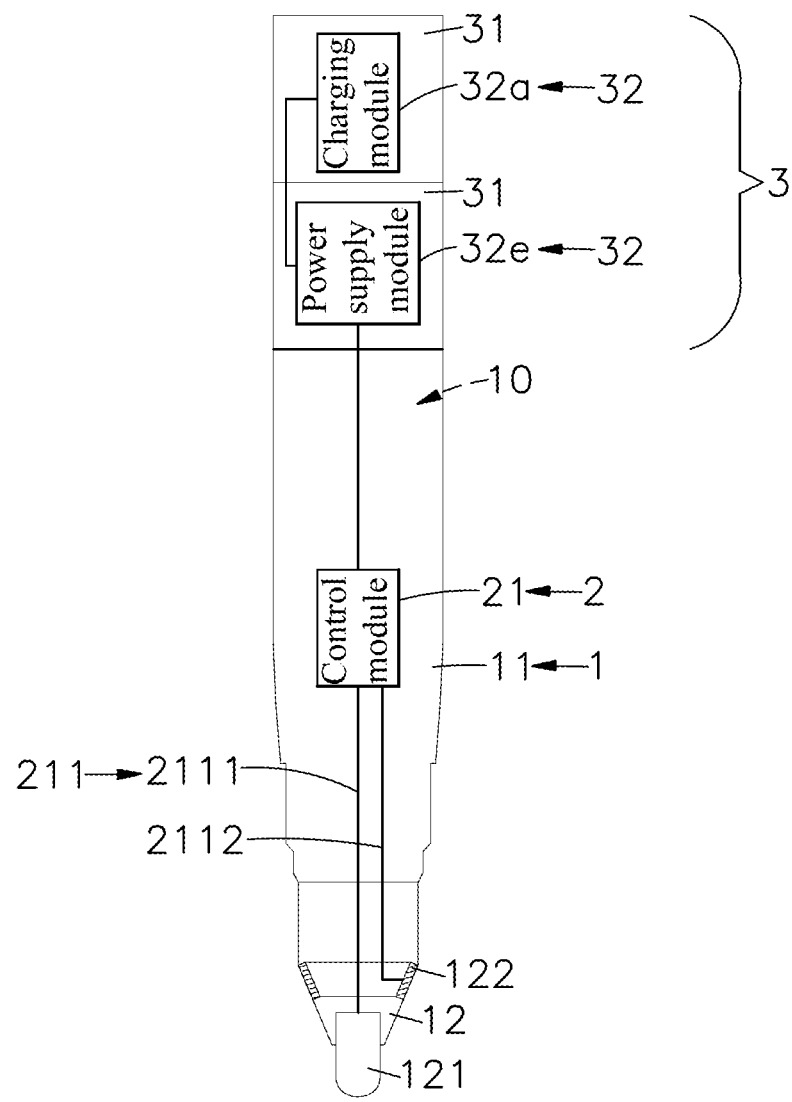
FIG. 5A is a block diagram of another preferred embodiment of a stylus of the present invention.
Figure 5B:
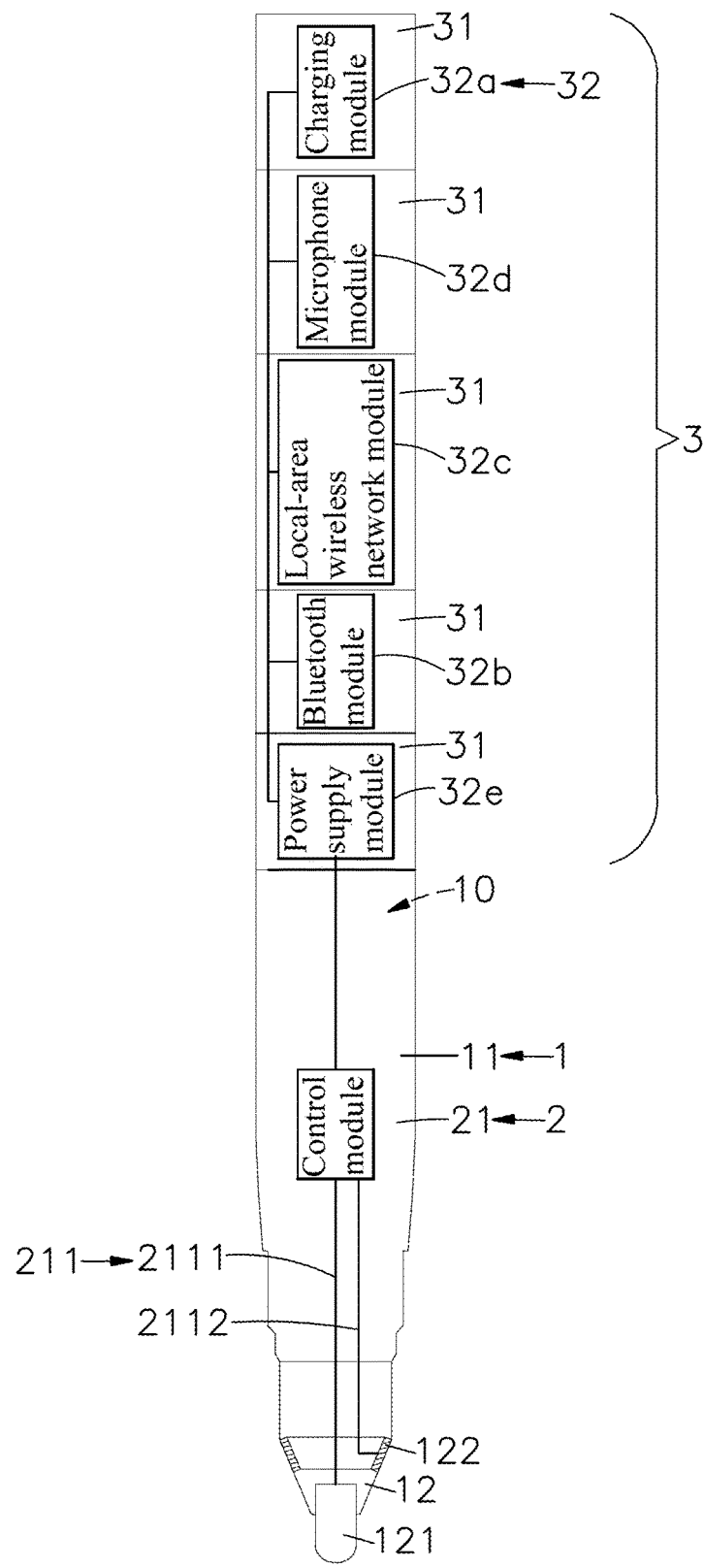
FIG. 5B is a block diagram of another preferred embodiment of a stylus of the present invention.

Please refer to FIGS. 5A and 5B, which show block diagrams of other preferred embodiment of a stylus of the present invention, respectively. As shown in FIGS. 5A and 5B, the difference between the internal circuit 2 of this embodiment and the internal circuit 2 of previous embodiment is that the pen body 1 of this embodiment does not include the power supply module 22, and the circuit module 32 of the modular function device 3 includes a power supply module 32e; preferably, the power supply module 32e can be a rechargeable battery or a lithium battery. The power supply module 32e can be disposed and connected between the connection interface 13 of the pen body 1 and the charging module 32a; however, this example is merely for exemplary embodiment, and the present invention is not limited to this example. In an embodiment, a plurality of modular function devices 3 can be mounted and stacked on the top part of the pen holder 11, and the power supply module 32e can be disposed between the connection interface 13 of the pen body 1 and the Bluetooth module 32b. It should be noted that various equivalent structural changes, alternations or modifications based on the descriptions and figures of present disclosure are all consequently viewed as being embraced by the spirit and the scope of the present disclosure set forth in the claims.

Figure 6:
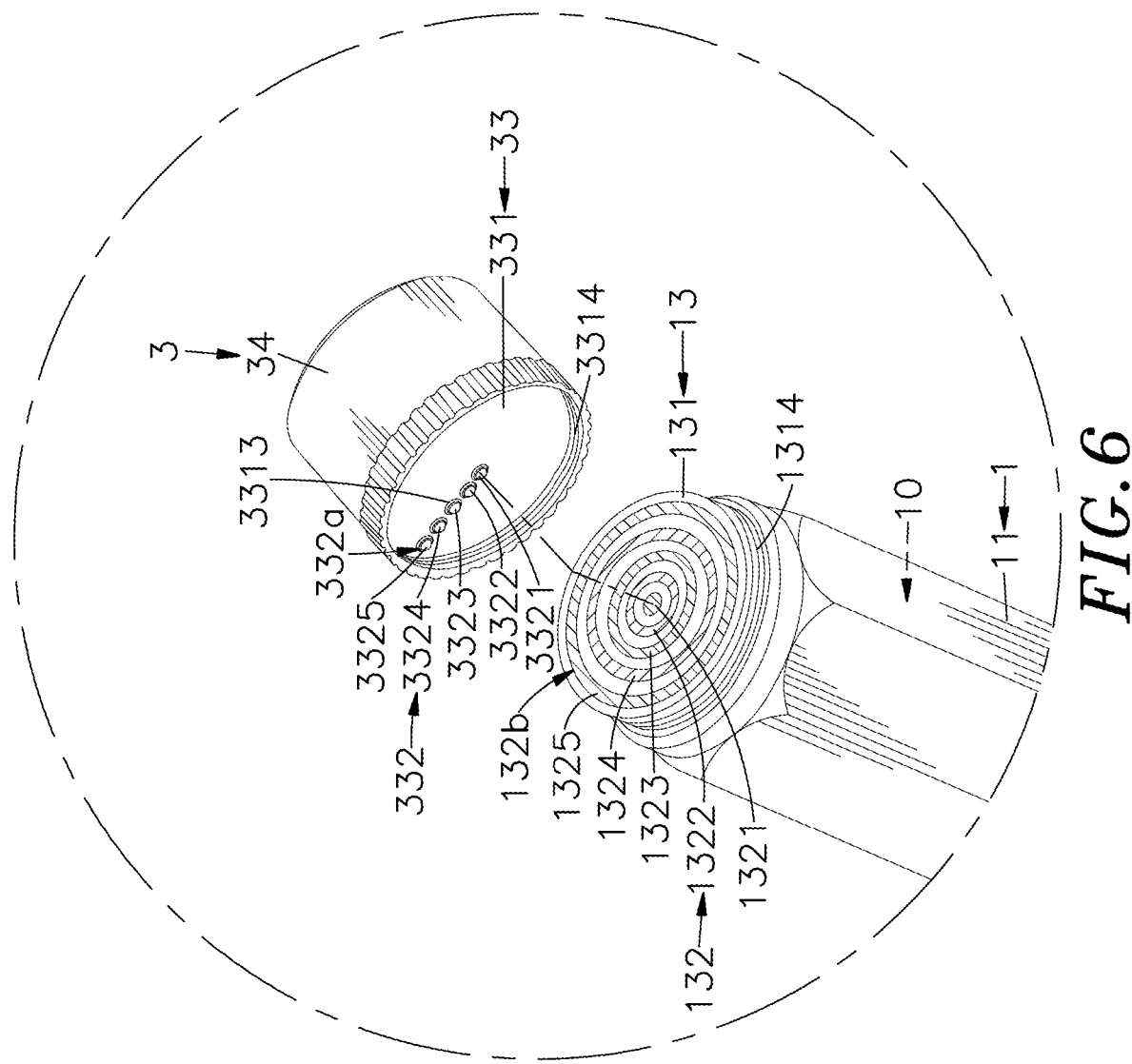
FIG. 6 is a schematic structural view of mounting portions of a pen body and a modular function device of another preferred embodiment of a stylus of the present invention.
Figure 7:
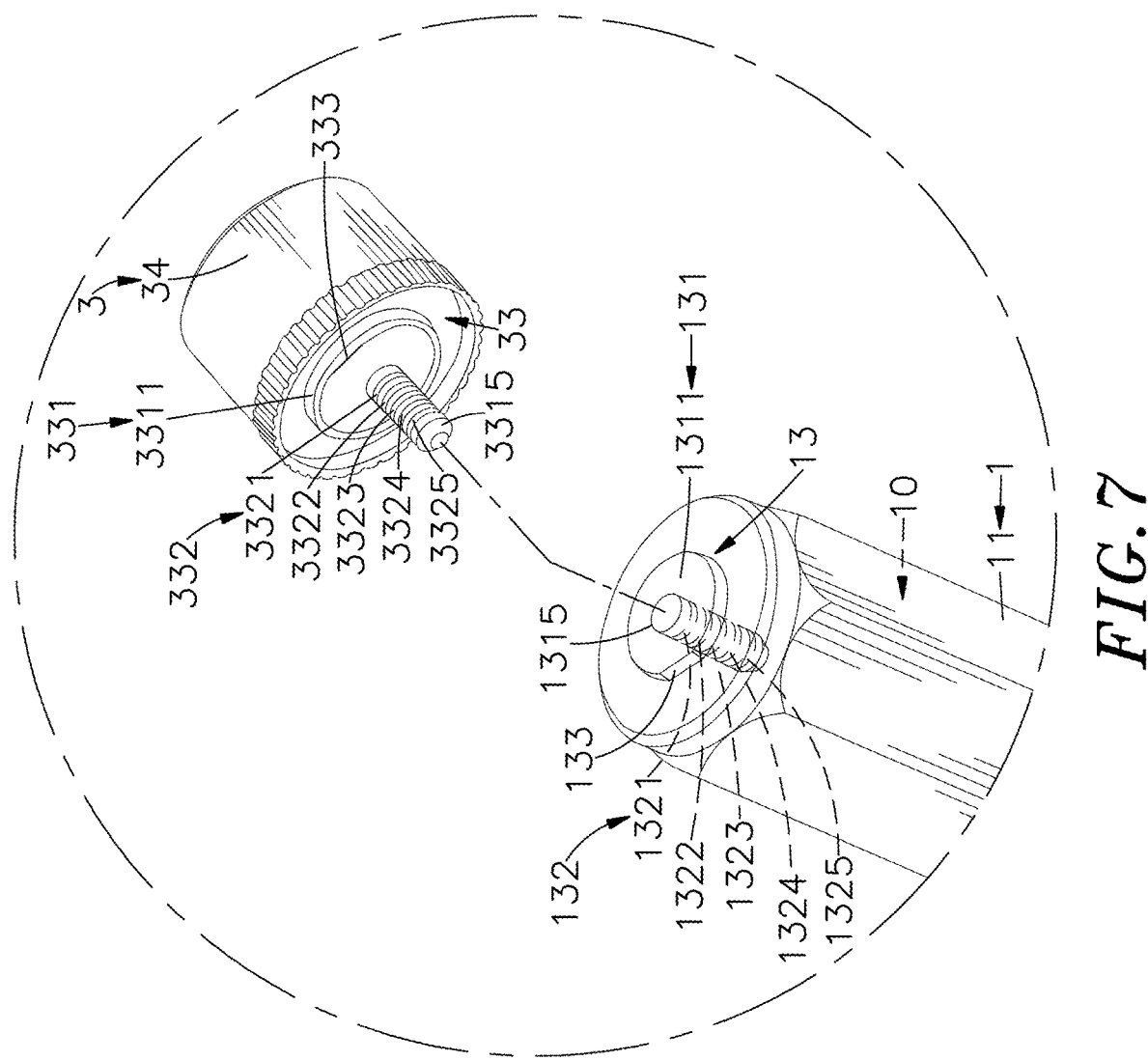
FIG. 7 is a schematic structural view of mounting portions of a pen body and a modular function device of alternative preferred embodiment of a stylus of the present invention.
Figure 8:
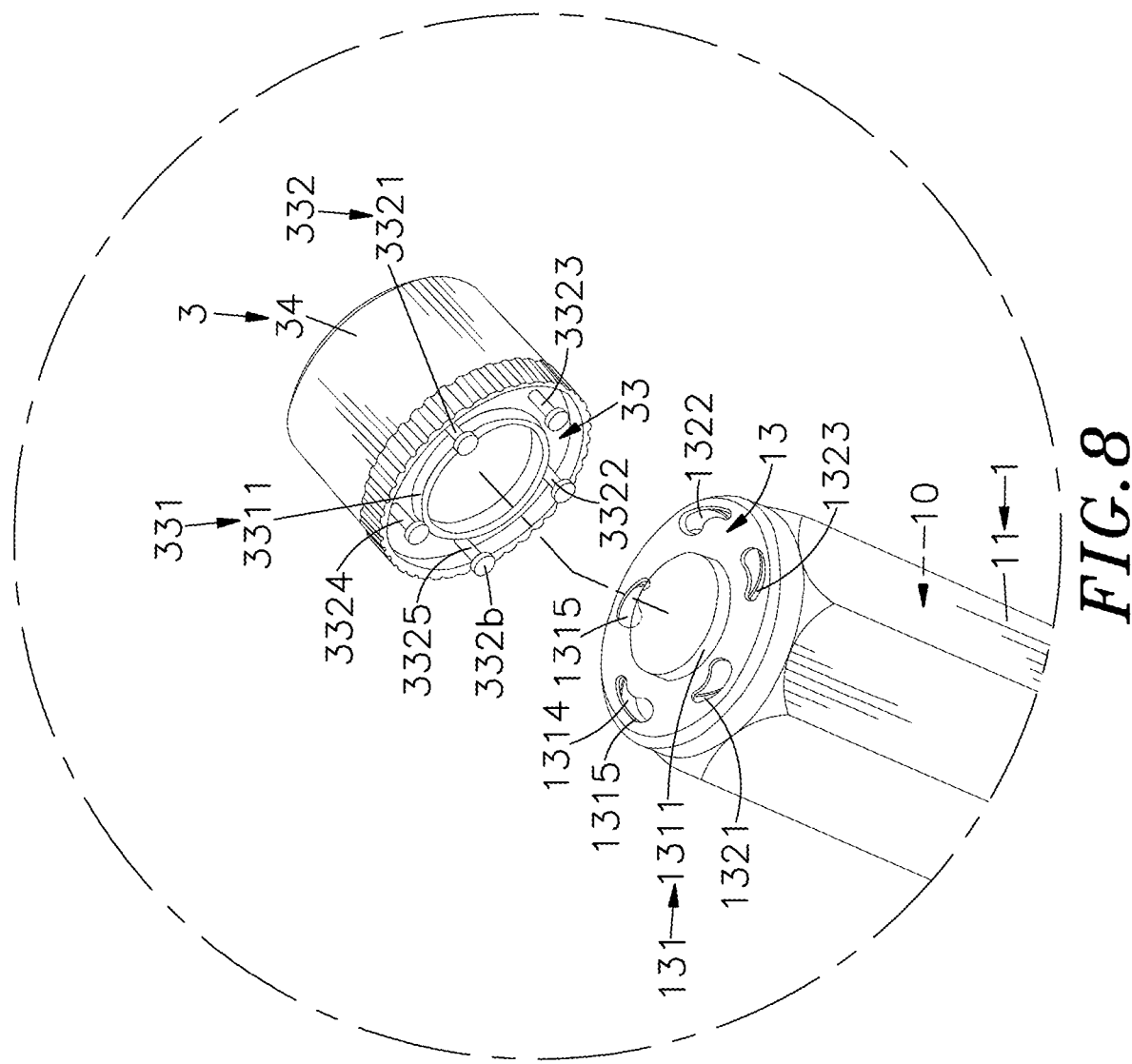
FIG. 8 is a schematic structural view of mounting portions of a pen body and a modular function device of alternative preferred embodiment of a stylus of the present invention.

Please refer to FIGS. 6 to 8, which show a schematic structural view of mounting portions of a pen body and a modular function device of another preferred embodiment of a stylus of the present invention, and schematic structural views of mounting portions of a pen body and a modular function device of another preferred embodiments of a stylus of the present invention. As shown in FIGS. 6 to 8, the pen body 1 and the modular function device 3, or the two adjacent modular function devices 3 are jointed to each other by the magnetic manner through the connection interfaces 13 and 33; however, the present invention is not limited to these examples, and in an embodiment, the connection interfaces 13 and 33 can be connected by a screwing manner, a plugging manner, or other jointing manner. As shown in FIG. 6, the difference between the connection interfaces 13 and 33 of this embodiment and previous embodiment is that the mounting portions of the first connector 131 and the second connector 331 of this embodiment include screw structures 1314 and 3314 (such as an outer thread or inner thread), respectively. The first set of contacts 132 comprises planar electrodes 132b arranged as concentric rings in interval from inside to outside; however, the present invention is not limited thereto. In an embodiment, the second set of contacts 332 of one of connection interface 33 of the modular function device 3 can include planar electrodes (not shown in figures) arranged as concentric rings in interval from inside to outside. In order to mount the pen body 1 with the modular function device 3, or mount two adjacent modular function devices 3 with each other, the first connector 131 and the second connector 331 can be connected by the screw structures 1314 and 3314, and the pogo pin connectors 332a electrically contact the planar electrodes 132b, or electrically contact the planar electrodes of the second set of contacts 332 of other modular function device 3, so that the internal circuit 2 of the pen body 1 can drive the modular function devices 3 to independently perform different function modes.

As shown in FIG. 7, the difference between the connection interfaces 13 and 33 of this embodiment and previous embodiment is that the first connector 131 of this embodiment includes an insertion hole 1315 formed at a central portion thereof, and the pogo pin connectors 132a or the conductive terminals of first set of contacts 132 axially arranged in interval are disposed in the insertion hole 1315, and the second connector 331 includes a plug terminal 3315 extended outwardly from a central portion thereof, and the second set of contacts 332 is disposed on the plug terminal 3315 and axially arranged in interval, to form a contact type similar to an audio terminal; however, the present invention is not limited thereto, and in an embodiment, the second connector 331 and the second set of contacts 332 of one of the connection interface 33 of the modular function device 3 can include the insertion hole and the pogo pin connectors (not shown in figure), and when the pen body 1 is connected to the modular function device 3, or two adjacent modular function devices 3 are connected to each other, the plug terminal 3315 of the second connector 331 can be plugged into the insertion hole 1315 of the first connector 131, and the second set of contacts 332 can electrically contact the pogo pin connectors 132a or conductive terminals of the first set of contacts 132; or, the plug terminal 3315 can be plugged into the insertion hole of the second connector 331 of another modular function device 3, and the second set of contacts 332 electrically contact the pogo pin connectors of the second set of contacts 332, respectively, so that the internal circuit 2 of the pen body 1 can drive the modular function devices 3 to independently perform different function modes.

As shown in FIG. 8, the difference between the connection interfaces 13 and 33 of this embodiment and previous embodiment is that the plurality of insertion holes 1315 of this embodiment are annularly arranged around a central portion of the first connector 131, to form the contact slot type similar to a lamp starter, and the pogo pin connectors 132a or contact clips of the first set of contacts 132 are disposed in the insertion holes 1315, respectively. The second set of contacts 332 can include the pins 332b like pins of the lamp starter; however, the present invention is not limited thereto, and in an embodiment, the second connector 331 and the second set of contacts 332 of one of the connection interface 33 of the modular function device 3 can include the insertion holes and the pogo pin connectors (not shown in FIG. 8), and when the pen body 1 is connected to the modular function device 3 or two adjacent modular function devices 3 are connected to each other, the pins 332b of the second set of contacts 332 of the second connector 331 can be plugged into the insertion holes 1315 of the first connector 131, respectively, and the second connector 331 can be then axially rotated by an angle to be fastened and positioned, and the pins 332b can electrically contact the spring clips of the first set of contacts 132, respectively; or, the pins 332b of the second set of contacts 332 of the second connector 331 can be plugged into the insertion holes of the second connector 331 of another modular function device 3, respectively, and the second connector 331 can be then axially rotated by an angle to be fastened and positioned, and the pins 332b can electrically contact the spring clips of the second set of contacts 332, respectively. As a result, according to the user's personal requirement, the stylus of the present invention can be extended with various modular function devices 3, and the modular function device 3 mounted on the stylus can also be replaced, so that the internal circuit 2 of the pen body 1 can drive the modular function devices 3 to independently perform different function modes.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A stylus with function modularization, applied to a touch panel of an external electronic device for a touch-controlled operation and a functional operation, and the stylus comprising:
    a pen body comprising a pen holder, a pen head, a connection interface, an accommodation space formed inside of the pen holder, wherein the pen head is disposed at a lower part of the pen holder and comprises a first conductive part, and the connection interface is disposed on an upper part of the pen holder and comprises a first connector, and the first connector comprises a first set of contacts, the first connector comprises a joint part disposed at a central part thereof and a first magnet mounted inside the joint part, and the joint part comprises a combination positioning corner formed on an outer side thereof, and the first set of contacts are annularly arranged around the joint part;
    an internal circuit disposed in the accommodation space of the pen holder, and comprising a control module and a power supply module, wherein the control module is electrically connected to the first conductive part of the pen head, the power supply module, and the first set of contacts; and
    at least one modular function device, wherein each of at least one modular function device comprises a main body, a circuit module disposed inside the main body, and connection interfaces disposed on upper and lower sides of the main body, respectively, and each of the connection interfaces of the at least one modular function device comprises a second connector and is configured to mount on the connection interface of the pen body, and each of the at least one modular function device comprises a positioning part disposed at a central part of the second connector of the connection interface, and a second magnet mounted inside the positioning part and configured to magnetically attach with the first magnet, and the positioning part comprises a combination positioning corner formed on an outer side thereof and corresponding to the combination positioning corner of the joint part, and the second connector comprises a second set of contacts annularly arranged around the positioning part, and the second set of contacts is electrically connected to the first set of contacts, and the second set of contacts are electrically connected to the control module and the power supply module of the internal circuit through the first set of contacts, so as to enable the control module to drive the at least one modular function device to perform different function modes.

2. The stylus according to claim 1, wherein the pen head of the pen body comprises a second conductive part disposed above the first conductive part, and the control module of the internal circuit is electrically connected to the first conductive part and the second conductive part through a driving signal line and a ground line of a circuit on a circuit board, respectively.

3. The stylus according to claim 1, wherein the first set of contacts comprises at least one function module connection terminal, a positive power output terminal, a negative power output terminal, a positive power input terminal and a negative power input terminal which are formed by pogo pin connectors and annularly arranged around the joint part of the first connector, and the second set of contacts comprises at least one function module connection terminal, a positive power output terminal, a negative power output terminal, a positive power input terminal and a negative power input terminal which are formed by pogo pin connectors and annularly arranged around the positioning part of the second connector.

4. The stylus according to claim 1, wherein the first set of contacts comprises at least one function module connection terminal, a positive power output terminal, a negative power output terminal, a positive power input terminal and a negative power input terminal, and the second set of contacts of the connection interface of each of the at least one modular function device comprises at least one function module connection terminal, a positive power output terminal, a negative power output terminal, a positive power input terminal and a negative power input terminal which are configured to electrically contact the first set of contacts, respectively.

5. The stylus according to claim 1, wherein the control module of the internal circuit comprises a control button electrically connected thereto and disposed on an outer part of the pen holder, and configured to trigger the control module to generate and output a control signal, and the control button includes a mechanical switch, a contact sensor, or an electronic switch device formed by at least one transistor.

6. The stylus according to claim 1, wherein the power supply module of the internal circuit comprises a rechargeable battery, a lithium battery, or an alkaline battery mounted inside the pen holder and being replaceable, and the rechargeable battery, the lithium battery, or the alkaline battery is disposed between the control module and the connection interface and electrically connected to the control module and the first set of contacts of the connection interface, so as to supply power to the stylus.

7. The stylus according to claim 1, wherein the main body of each of the at least one modular function device comprises connection interfaces disposed on upper and lower sides thereof, respectively, and one of the connection interfaces is mounted on the pen body, or stacked on the connection interface of a former modular function device, and the circuit module of each of the at least one modular function device comprises a charging module configured to supply power to the power supply module for charging through the connection interface, and the other connection interface of each of the at least one modular function device is compliant with Micro-USB specification, USB Type-C specification, or Lightning interface specification.

8. The stylus according to claim 1, wherein the main body of each of the at least one modular function device comprises connection interfaces disposed on upper and lower sides thereof, respectively, and two adjacent modular function devices are stacked with each other through adapted connection interfaces thereof along a central axis of the pen body, to form a concatenated status, and the at least one modular function device and the internal circuit of the pen body form plug-and-play function with a standardization interface protocol through the connection interface, so as to enable the control module of the internal circuit to drive the circuit module of the at least one modular function device to perform different function modes.

9. The stylus of according to claim 8, wherein the at least one modular function device is multiple, and the multiple modular function devices are mounted and stacked on the upper part of the pen body, to concatenate with each other through the connection interfaces thereof, and the circuit module of each of the multiple modular function devices comprises the charging module configured to supply power to the power supply module for charging through the connection interface, or a Bluetooth module, a local-area wireless network module or a microphone module which is connected between the charging module and the connection interface of the pen body.

10. A stylus with function modularization, applied to a touch panel of an external electronic device for a touch-controlled operation and a functional operation, and the stylus comprising:
a pen body comprising a pen holder, a pen head, a connection interface, and
an accommodation space formed inside of the pen holder, wherein the pen head is disposed on a lower part of the pen holder and comprises a first conductive part, and the connection interface is disposed on an upper part of the pen holder and comprises a first connector, and the first connector comprises a first set of contacts;
the first connector comprises a joint part disposed at a central part thereof and a first magnet mounted inside the joint part, and the joint part comprises a combination positioning corner formed on an outer side thereof, and the first set of contacts annularly arranged around the joint part;
an internal circuit disposed in the accommodation space of the pen holder, and comprising a control module electrically connected to the first conductive part of the pen head and the first set of contacts; and
at least two modular function devices, wherein each of at least two modular function devices comprises a main body, a circuit module disposed inside the main body, and connection interfaces disposed on upper and lower sides of the main body, respectively, wherein each of the connection interfaces of the at least two modular function devices comprises a second connector, and
each of the at least two modular function devices comprises a positioning part disposed at a central part of the second connector of the connection interface, and a second magnet mounted inside the positioning part and configured to magnetically attach with the first magnet, and the positioning part comprises a combination positioning corner formed on an outer side thereof and corresponding to the combination positioning corner of the joint part, and
the second connector comprises a second set of contacts annularly arranged around the positioning part, and the second set of contacts is electrically connected to the first set of contacts, and
wherein the pen body and the at least two modular function devices of the two adjacent modular function devices are stacked with each other through the connection interfaces thereof along a central axis of the pen body, to form a concatenated status, and the at least two modular function devices are electrically connected to the control module of the internal circuit, so as to enable the control module to drive the at least two modular function devices to perform different function modes, and the circuit module of one of the at least two modular function devices comprises a power supply module configured to supply power to the stylus.

11. The stylus according to claim 10, wherein the pen head comprises a second conductive part disposed above the first conductive part, and the control module of the internal circuit is electrically connected to the first conductive part and the second conductive part of the pen head through a driving signal line and a ground line of a circuit on the circuit board, respectively.

12. The stylus according to claim 10, wherein the first set of contacts comprises at least one function module connection terminal, a positive power output terminal, a negative power output terminal, a positive power input terminal and a negative power input terminal which are formed by pogo pin connectors and annularly arranged around the joint part of the first connector, and the second set of contacts of the connection interface of each of the at least two the modular function devices comprises at least one function module connection terminal, a positive power output terminal, a negative power output terminal, a positive power input terminal and a negative power input terminal which are formed by pogo pin connectors and annularly arranged around the positioning part of the second connector.

13. The stylus according to claim 11, wherein the first set of contacts comprises at least one function module connection terminal, a positive power output terminal, a negative power output terminal, a positive power input terminal and a negative power input terminal, and the second set of contacts of one of the connection interfaces of each of the at least two modular function devices comprises at least one function module connection terminal, a positive power output terminal, a negative power output terminal, a positive power input terminal and a negative power input terminal which are configured to electrically contact the first set of contacts, respectively.

14. The stylus according to claim 10, wherein the control module of the internal circuit comprises a control button electrically connected thereto and disposed on an outer part of the pen holder, and configured to trigger the control module to generate and output a control signal, and the control button comprises a mechanical switch, a contact sensor, or an electronic switch device formed by at least one transistor.

15. The stylus according to claim 10, wherein the power supply module of the circuit module of each of the at least two modular function devices comprises a rechargeable battery, a lithium battery, or an alkaline battery mounted inside the pen holder and being replaceable, and the rechargeable battery, the lithium battery or the alkaline battery is disposed between the pen body and the connection interface of another modular function device, and electrically connected to the first set of contacts and second set of contacts of the two connection interfaces, so as to supply power to the stylus.

16. The stylus according to claim 10, wherein one of the connection interfaces of one of the at least two modular function devices is mounted and stacked with one of the connection interfaces of the former modular function device, and the former modular function device comprises the power supply module, and the circuit module of each of the at least two modular function device comprises a charging module configured to supply power to the power supply module for charging, through the connection interface, and wherein the other of the connection interfaces of each of the at least two modular function devices is compliant with Micro-USB specification, USB Type-C specification, or Lightning interface specification.

17. The stylus according to claim 10, wherein the at least two modular function devices are stacked with each other through adapted connection interface thereof and along a central axis of the pen body, to form a concatenated status, and the modular function device and the internal circuit of the pen body form plug-and-play function with a standardization interface protocol through the connection interface, so as to enable the control module of the internal circuit to drive the circuit modules of the at least two modular function devices to independently perform different function modes.

18. The stylus according to claim 17, wherein the at least two modular function devices are concatenated with each other, and disposed and stacked on the upper part of the pen body through the connection interface thereof, and the circuit module of each of the at least two modular function devices comprises a charging module configured to supply power to the power supply module for charging, through the connection interface, or a Bluetooth module, a local-area wireless network module, or a microphone module which is disposed between the power supply module and the charging module.

* * * * *